United States Patent
Kontetzki et al.

(10) Patent No.: US 8,051,995 B2
(45) Date of Patent: Nov. 8, 2011

(54) ENERGY DISSIPATION DEVICE FOR A CAR BODY OF A MULTI-MEMBER RAIL VEHICLE

(75) Inventors: Arthur Kontetzki, Salzgitter (DE); Antony Jones, Shavington-Cheshire (GB)

(73) Assignee: Voith Patent GmbH (DE)

( * ) Notice: Subject to any disclaimer, the term of this patent is extended or adjusted under 35 U.S.C. 154(b) by 340 days.

(21) Appl. No.: 11/957,886

(22) Filed: Dec. 17, 2007

(65) Prior Publication Data

US 2009/0151595 A1    Jun. 18, 2009

(51) Int. Cl.
*B61G 5/00* (2006.01)

(52) U.S. Cl. ............................................ 213/1 A; 213/7

(58) Field of Classification Search .................. 213/1 A, 213/40 R, 41, 44, 46 A, 49, 53, 56, 64, 7; 116/203

See application file for complete search history.

(56) References Cited

U.S. PATENT DOCUMENTS

| | | | |
|---|---|---|---|
| 3,086,765 A * | 4/1963 | Zanow | 267/141.1 |
| 6,027,105 A * | 2/2000 | Dohrmann et al. | 267/139 |
| 6,360,906 B1 * | 3/2002 | Kaufhold et al. | 213/75 R |

FOREIGN PATENT DOCUMENTS

| | | |
|---|---|---|
| DE | 20 2005 004502 | 5/2005 |
| EP | 0417594 | 3/1991 |
| EP | 1247716 | 10/2002 |
| EP | 1637426 | 3/2006 |
| WO | WO 2005/075272 | 8/2005 |
| WO | WO 2005/111438 | * 11/2005 |

* cited by examiner

*Primary Examiner* — Mark Le
(74) *Attorney, Agent, or Firm* — Galbreath Law Offices, P.C.; John A. Galbreath (57) ABSTRACT

An energy dissipation device (1) is provided for a car body of a multi-element vehicle in particular a rail vehicle, the energy dissipation device (1) having a damping unit (10) having a regeneratively implemented damping element (11) for damping traction and impact forces occurring in normal travel operation and an energy dissipation unit (20) having a destructively implemented energy dissipation element (21), and the energy dissipation element (21) being designed to respond after a previously determinable critical impact force is exceeded and to transmit at least a part of the impact forces transmitted via the energy dissipation device (1) into heat and deformation work by plastic deformation and thus dissipate them. In order that the energy dissipation device (1) only requires a small installation space, the damping unit (10) is integrated in the energy dissipation unit (20) in such a way that during a transmission of impact forces, the force flux runs through both the damping unit (10) and also the energy dissipation element (20).

7 Claims, 4 Drawing Sheets

ENERGY DISSIPATION DEVICE FOR A CAR BODY OF A MULTI-MEMBER RAIL VEHICLE

BACKGROUND OF THE INVENTION (1) Field of the Invention

The present invention relates to an energy dissipation device for a car body of a multielement vehicle, in particular a rail vehicle, the energy dissipation device having a damping unit having a regeneratively implemented damping element for damping traction and impact forces occurring in normal travel operation, as well as an energy dissipation unit having a destructively implemented energy dissipation element, the destructively implemented energy dissipation element being designed to respond after a previously established critical impact force is exceeded and to convert at least a part of the impact forces transmitted via the energy dissipation device into heat and deformation work by plastic deformation and thus dissipate them.

(2) Description of Related Art

Energy dissipation devices of the type cited at the beginning are generally known in principle from the prior art and are used, for example, in rail vehicle technology in particular as a shock absorber. Such a shock absorber typically comprises a combination of a damping unit (for example, in the form of a spring apparatus) and an energy dissipation unit. The damping unit is used for damping the traction and impact forces occurring in normal travel operation, while the vehicle is protected in particular even at greater collision speeds using the energy dissipation unit.

Typically, the damping unit absorbs traction and impact forces up to a defined dimension and relays forces exceeding this dimension into the vehicle chassis. Traction and impact forces which occur, for example, between the individual car bodies during normal travel operation in a multielement rail vehicle are thus absorbed in this shock absorber, which is typically implemented as regenerative.

If the operating load of the damping unit, which is typically implemented as regenerative, is exceeded, in contrast, upon impact of the vehicle on an obstruction or upon abrupt braking of the vehicle, for example, the danger arises that the damping unit and the possibly provided joint or coupling connection between the individual car bodies and/or more generally expressed the interface between the individual car bodies will possibly be destroyed or damaged. In any case, the damping unit is not sufficient for damping the total incident energy. The damping unit is thus no longer incorporated in the energy dissipation concept of the overall vehicle.

To prevent the incident impact energy from being transmitted directly to the vehicle chassis in such a crash case, connecting an energy dissipation unit downstream from the damping unit is known from rail vehicle technology. The energy dissipation unit typically responds after the operating load of the damping unit is exceeded and is used to at least partially dissipate the incident impact energy, i.e., convert it into heat energy and deformation work, for example. Providing an energy dissipation unit of this type is fundamentally advisable for reasons of derailing safety, to prevent the impact energy incident in case of a crash from being transmitted directly to the vehicle chassis, and in particular the vehicle chassis from being subjected to extreme loads and being damaged or even destroyed in certain circumstances.

To protect the vehicle chassis from damaged upon strong collision impacts, an energy dissipation unit having a destructively implemented energy dissipation element is frequently used as a so-called "shock absorber", which is designed in such a way, for example, that it responds after the operating dissipation of the damping unit is exhausted and at least partially absorbs and dissipates the energy transmitted by the force flux via the energy dissipation element. A deformation pipe comes into consideration in particular as the energy dissipation element, in which, after a critical impact force is exceeded, the impact energy introduced into the energy dissipation unit is converted into deformation work and heat by an (intended) plastic deformation in a destructive way.

Figure 1:
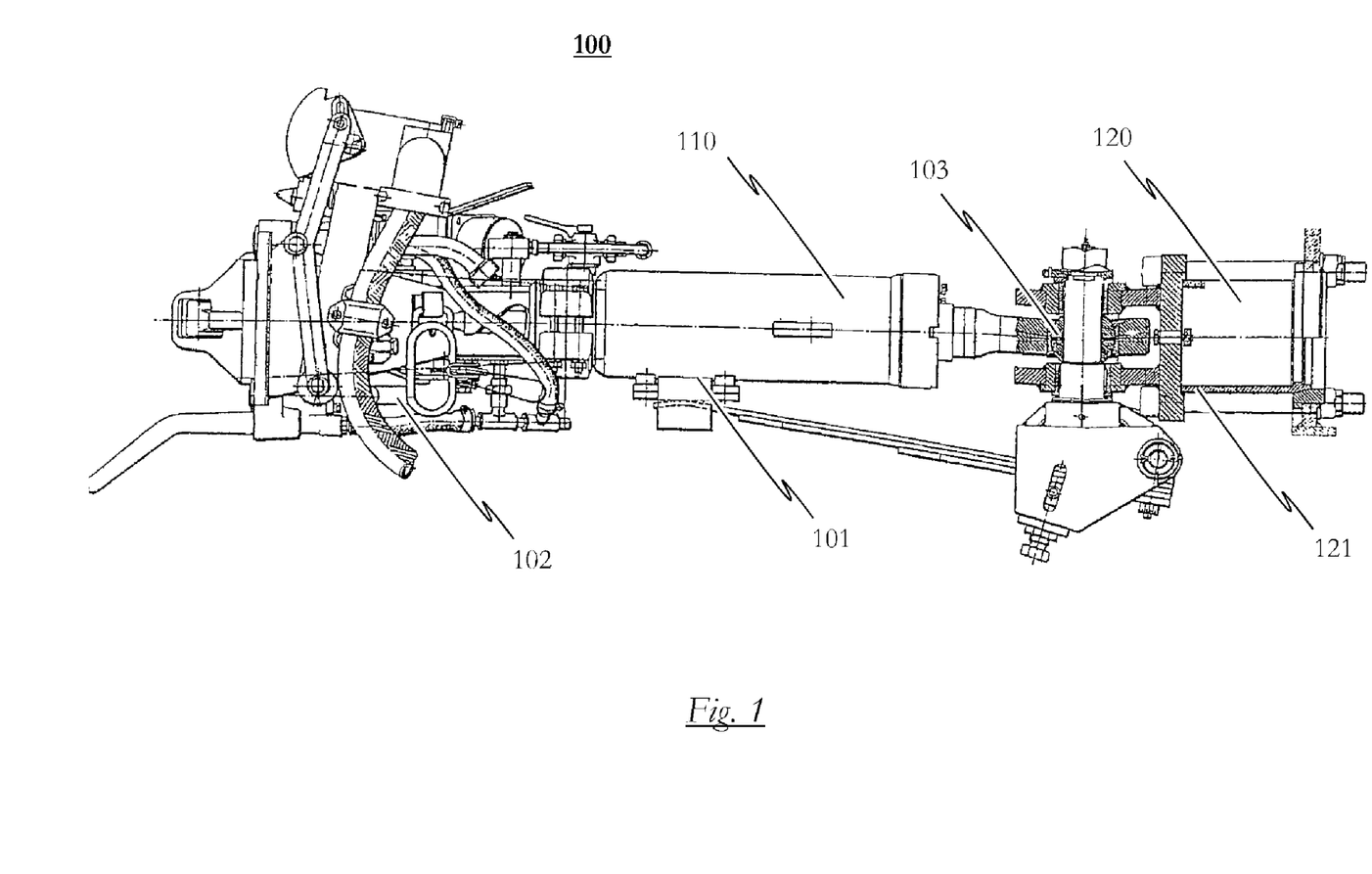
FIG. 1: shows an automatic middle buffer coupling from the prior art.

An automatic middle buffer coupling 100 for a rail vehicle known from the prior art is shown FIG. 1, this middle buffer coupling 100 being provided with an energy dissipation device of the type cited at the beginning. The middle buffer coupling 100 is linked via a bearing bracket 103 to the front face of a car body (not explicitly shown) in such a way that horizontal and vertical pivoting and axial rotation (cardanic movement) of the coupling rods 101 with the coupling head 102 are made possible.

In the middle buffer coupling 100 shown in FIG. 1, a damping unit 110 is implemented in the form of a traction/impact unit, which absorbs traction and pressure forces up to a defined size and relays forces exceeding this undamped into the vehicle chassis (not explicitly shown) of the car body via the bearing bracket. Various variants come into consideration as the traction/impact unit 110. In the embodiment shown in FIG. 1, a friction spring integrated in the coupling rod 101 on one hand and a spheroplastic bearing on the other hand are used as the traction/impact unit. Using this measure it is possible that the traction/impact forces occurring in normal travel operation and transmitted from the coupling head 102 via the coupling rod 101 to the bearing bracket 103 are damped in the damping unit 110 (traction/impact unit and/or spring apparatus) integrated in the coupling rod 101.

To protect the vehicle chassis (not explicitly shown in FIG. 1) at greater collision velocities, the damping unit 110 (traction/impact unit and/or spring apparatus) integrated in the coupling rod 101 has an energy dissipation unit 120 connected downstream, which is used as a shock absorber. The energy dissipation unit 120 has a destructively implemented energy dissipation element 121 in the form of a deformation pipe. The deformation pipe 121 is designed to respond after the operating load of the damping unit 110 is exceeded and to at least partially dissipate the impact energy introduced into the energy dissipation unit 120 after the operating dissipation of the damping unit 110 is exhausted.

The dissipation of the impact energy occurs in multiple stages. After the operating load of the damping unit 110 is exceeded, the coupling rod 101 and the bearing bracket 103 are shifted in relation to the car body in the direction of the car body. As already noted, the energy dissipation element 121 is implemented as a deformation pipe. The deformation pipe 121 has its end on the car body side projecting into a conical hole provided in a nozzle plate—although this is not explicitly shown in FIG. 1. In case of a crash, i.e., after exceeding the operating load of the damping unit 110, the bearing bracket 103 shifts with the deformation pipe 121 in relation to the chassis of the rail vehicle in the direction of the nozzle plate, the deformation pipe 121 being pressed through the conical hole provided in the nozzle plate with reduction of its cross-section and converting at least a part of the total incident impact energy into heat energy and plastic deformation work.

Accordingly, the energy dissipation device used in the middle buffer coupling 100 shown in FIG. 1 comprises the damping unit 110 integrated in the coupling rod 101 on one hand and the energy dissipation unit 120 connected downstream from the damping unit 110 on the other hand. This combination of damping unit 110 and downstream energy dissipation unit 120 not only allows damping of the traction and impact forces occurring in normal travel operation, but rather also offers protection from damage to the vehicle chassis in the event of strong collision impacts.

The disadvantage of this energy dissipation device known from the prior art may be seen in that—because of the combination of damping unit and downstream energy dissipation unit used—a relatively large installation space must be available to implement the energy dissipation device as a whole. On one hand, it is necessary to integrate the damping unit in the coupling rod, as a result of which the coupling rod may not be shortened arbitrarily, but rather must fundamentally have a specific minimal length. On the other hand, because of the energy dissipation unit connected downstream from the damping unit, an installation space is also additionally to be provided behind the front face of the car body.

This installation space to be provided for implementing the energy dissipation device may not be provided in all vehicle and/or car body types, however, because the front face design of the car body only offers restricted installation space, for example.

BRIEF SUMMARY OF THE INVENTION

Accordingly, the present invention is based on the object of specifying an energy dissipation device, using which both damping of the traction and impact forces occurring in normal operation and also dissipation of the impact forces occurring in case of a crash are made possible in a small installation space.

This object is achieved by an energy dissipation device of the type cited at the beginning in that according to the present invention the damping unit is integrated in the energy dissipation unit in such a way that upon a transmission of impact forces, the force flux runs through both the damping unit and also the energy dissipation element.

The advantages achievable by the solution according to the present invention are obvious. On one hand, with the suggested solution, the damping unit having the regeneratively implemented damping element used for damping the traction and impact forces occurring in normal travel operation is integrated in the energy dissipation unit. On the other hand, according to the present invention, the damping unit is designed and integrated in the energy dissipation unit in such a way that during an impact force transmission, the force flux runs through both the damping unit and also the energy dissipation element. Accordingly, in the solution according to the present invention, the damping element belonging to the damping unit is connected in parallel to the energy dissipation element belonging to the energy dissipation unit. In particular—in contrast to the energy dissipation devices known from the prior art—in the solution suggested here, the energy dissipation element of the energy dissipation unit is not connected downstream from the damping unit.

In that connecting the damping element of the damping unit in series to the energy dissipation element of the energy dissipation unit may be dispensed with using the solution according to the present invention, the overall installation length of the energy dissipation device and thus the installation space to be provided for implementing the energy dissipation device may thus advantageously be reduced. As already noted, this is achieved according to the present invention in that the damping element of the damping unit is connected in parallel to the energy dissipation element of the energy dissipation unit in such a way that upon a transmission of impact forces, the incident force flux fundamentally runs through both the damping element and also the energy dissipation element.

Advantageous refinements of the solution according to the present invention are specified in the subclaims.

Thus, in a particularly preferred implementation of the energy dissipation device according to the present invention, the energy dissipation element is implemented as a deformation pipe having a car-body-side first deformation pipe section and an opposing second deformation pipe section. The second deformation pipe section advantageously has an expanded cross-section in comparison to the first deformation pipe section, the damping unit having the damping element being integrated in the (expanded) second deformation pipe section. In this preferred implementation of the energy dissipation device, a deformation pipe which has an essentially rectangular characteristic curve is used as the energy dissipation element, by which maximum energy absorption is ensured after the response of the energy dissipation unit.

In regard to the damping unit, it is also advantageous if it has first and second pressure plates, between which the damping element is situated, the two pressure plates being displaceable in relation to one another with simultaneous shortening of the distance between them in the longitudinal direction of the energy dissipation device upon introduction of traction or impact forces occurring in normal travel operation into the energy dissipation device. For example, rubber spring elements, which are situated between the two pressure plates, come into consideration as the damping element. Of course, using a gas-hydraulic buffer element or a hydrostatic buffer element as the damping element is also conceivable. All damping elements are distinguished by their regenerative (self-restoring) mode of operation, the response force of the damping unit being selected as needed by a suitable selection of the damping element. Of course, a combination of different damping elements also comes into consideration.

As already noted, it is especially preferable for a deformation pipe having a first deformation pipe section and a second deformation pipe section to be used as the energy dissipation element, the second deformation pipe section having a cross-section expanded in comparison to the first deformation pipe section. In a preferred implementation of the energy dissipation device according to the present invention, the damping unit having the previously cited pressure plates and the damping element situated between them is also integrated in the second deformation pipe section. The second deformation pipe section especially preferably has a guide face, with which the first and second pressure plates of the damping unit interact in such a way that in the event of a longitudinal displacement of the pressure plates, the movement thereof is guided appropriately in the longitudinal direction of the energy dissipation device.

In this preferred implementation, in which the second deformation pipe section of the energy dissipation unit receives the two pressure plates of the damping unit and is simultaneously used as a guide of the pressure plates, it is particularly also possible through this double function assigned to the second deformation pipe section of the energy dissipation unit to reduce the number of components of the energy dissipation device and thus the total weight thereof.

In an especially preferred refinement of the last cited embodiment, in which the two pressure plates of the damping unit are received in the second deformation pipe section of the energy dissipation unit and are guided via guide faces in the second deformation pipe section, the damping unit has a first stop assigned to the first pressure plate and a second stop assigned to the second pressure plate, which are also preferably integrated inside the second deformation pipe section and are used for limiting the longitudinal displaceability of the two pressure plates. In addition, it is advantageous for this purpose if the energy dissipation device also has a force transmission element for introducing traction and impact forces into the damping unit, this force transmission element comprising an end section on the car body side, which runs through the first pressure plate, the damping element, and the second pressure plate, and has a counter element on its car-body-side end, which works together with the second pressure plate at least during a traction force transmission and transmits traction forces from the force transmission element to the second pressure plate. Any component which is used for transmitting traction and/or impact forces comes into consideration as the force transmission element. In particular, it is preferable for the end section of the force transmission element to have a guide face which works together with corresponding guide faces in the passages of the two pressure plates and the damping element and thus ensures guiding of the pressure plates upon their longitudinal displacement in the longitudinal direction of the energy dissipation device.

By providing a guide of the force transmission element of this type, a design which is low in wear and maintenance is provided, using which the traction and pressure forces transmitted to the energy dissipation device may be introduced into the damping unit with as little friction as possible. These forces are then transmitted to the damping element and absorbed therein because of the movement of the two pressure plates in relation to one another.

As already noted, in the solution according to the present invention, the damping element of the damping unit and the energy dissipation element of the energy dissipation unit are connected in parallel to one another. A measure for implementing this parallel connection of damping element and energy dissipation element, which is particularly simple to implement but nonetheless effective, comprises providing the damping unit with a conical ring which is situated at the transition between the first and second deformation pipe sections and works together with the second stop in such a way that the forces transmitted from the second pressure plate to the second stop during an impact force transmission are transmitted via the conical ring to the first deformation pipe section.

It is possible through a suitable selection of the wall thickness of the first deformation pipe section and/or of the material of the first deformation pipe section to specify the impact force critical for the response of the energy dissipation element beforehand. This critical impact force is advantageously to lie in an order of magnitude in which the damping property of the damping unit is exhausted.

In the solution according to the present invention, after the operating dissipation of the damping element provided in the damping unit is exhausted, the damping unit having the conical ring situated at the transition between the first and the second deformation pipe section is pressed into the first deformation pipe section. As a result, the cross-section of the first deformation pipe section is expanded plastically, so that at least a part of the transmitted impact forces are converted into deformation work and heat.

In order that, upon response of the energy dissipation unit, the movement of the damping unit having the conical ring in relation to the first deformation pipe section occurs after a previously predictable event sequence, without jamming or wedging occurring in particular, in a preferred refinement, the conical ring has a guide section which at least partially projects into the first deformation pipe section and presses against the internal face of the first deformation pipe section.

The advantages achievable using this preferred refinement are obvious. On one hand, by providing the deformation pipe as the energy dissipation element, which is designed to deform plastically with cross-sectional expansion if the operating load of the damping unit is exceeded, an energy dissipation device is provided, which, in addition to damping the traction and impact forces occurring in normal travel operation, allows a maximum energy dissipation in the smallest possible installation space in case of a crash. In particular, it is advantageous for this purpose that the energy dissipation element (deformation pipe) is designed to deform plastically with cross-sectional expansion if the operating load of the damping unit is exceeded. During and/or after the response of the energy dissipation unit, the plastically deformed deformation pipe thus remains inside the energy dissipation device and does not have to be ejected into a space additionally provided in the chassis of the car body, for example, for the plastic deformation in particular.

On the other hand, using the suggested solution, by providing the conical ring having the guide section, a previously determinable event sequence during the energy dissipation in case of a crash is also possible. This guide section of the conical ring connected via its coupling-level-side end section to the damping unit thus projects with its car-body-side end section at least partially into the deformation pipe section, whose cross-section is not expanded in comparison to the expanded cross-section of the coupling-level-side end section of the deformation pipe before response of the energy dissipation unit. Because on one hand the guide section of the conical ring presses against the internal surface of the deformation pipe section, which is not expanded before response of the energy dissipation unit, and because on the other hand the coupling-level-side end section of the conical ring is connected to the damping unit, upon response of the energy dissipation unit, i.e., when the damping unit having the conical ring and the guide section implemented thereon moves in relation to the deformation pipe, which is permanently connected to the car body, in the direction toward the car body, the guide section of the conical ring runs along the internal surface of the not (yet) expanded deformation pipe section and thus axially guides the damping unit, which moves in relation to the deformation pipe in the direction of the car body in case of a crash. This axial guiding prevents jamming of the damping unit in the deformation pipe upon response of the energy dissipation unit, so that the plastic deformation of the deformation pipe (i.e., the plastic cross-sectional expansion of the deformation pipe) occurs in a predictable way and in case of a crash the event sequence of the energy dissipation is predictable overall.

In a preferred implementation of the latter embodiment, it is conceivable that the guide section of the conical ring is implemented in one piece with the conical ring. In this implementation, on one hand the axial guiding of the damping unit upon response of the energy dissipation unit and on the other hand the function of the conical ring are thus assumed by the conical ring.

In the latter possible implementation of the solution according to the present invention, in which the guide section is implemented in one piece with the conical ring, it would also be conceivable for the coupling-level-side end section of the conical ring to be engaged in a formfitting way with the car-body-side end section of the damping unit. In that a formfitting connection is selected between the car-body-side end section of the damping unit and the coupling-level-side end section of the conical ring, fundamentally, a secure and defined force transmission from the damping unit to the conical ring and thus into the deformation pipe is also particularly possible upon response of the energy dissipation unit. During an impact force introduction into the energy dissipation device, the force introduced from the force transmission element into the damping unit is thus guided on one hand through the damping element of the damping unit and on the other hand via the conical ring into the not (yet) expanded deformation pipe section.

In particular by providing a conical ring in the transition section between the already expanded deformation pipe section and the not (yet) expanded deformation pipe section, a particularly high, and in the ideal case complete, force introduction from the damping unit into the transition section of the deformation pipe may be implemented, by which on one hand the response time and the response behavior of the energy dissipation unit and on the other hand the event sequence during the energy dissipation, i.e., after the response of the energy dissipation unit, are precisely determinable beforehand.

Alternatively to the latter embodiment, in regard to the connection between the coupling-level-side end section of the conical ring and the car-body-side end section of the damping unit in the form of a formfitting engagement, it is also conceivable, of course, that a formfitting/friction-locked connection or a purely friction-locked connection is provided here, implemented with the aid of a screw connection, for example.

Fundamentally, the coupling-level-side end section of the conical ring is to be connected to the car-body-side end section of the damping unit with as little play as possible, to shorten and/or precisely determine beforehand and to define the response time and the response behavior of the energy dissipation unit in case of a crash.

In regard to the fixed connection of the deformation pipe to the front face and/or to the chassis of the car body, it is preferable for the coupling-level-side end section of the already expanded (second) deformation pipe section to be attachable to the associated car body with the aid of a screw connection. Additionally or alternatively thereto, however, it is also conceivable for the second deformation pipe section to be attachable to the car body via a formfitting connection. These are possible implementations, using which the deformation pipe may be connected fixed to the chassis of the associated car body, for example. Of course, other embodiments are also conceivable here.

In order that the integral construction of the energy dissipation device comprising the damping unit and the energy dissipation unit is maintained even in the event of a traction force transmission, in an especially preferred implementation of the solution according to the present invention, the damping unit also has a pre-tension element which pre-tensions the end section of the damping unit on the car body side against the conical ring via the second stop. For example, a guide pipe comes into consideration as the pre-tension element, which is connected in a friction-locked and/or formfitting way to the second stop on its car-body-side end and abuts the first stop on its opposite end and establishes a constant distance between the two stops before response of the energy dissipation unit.

In the latter embodiment, in which a guide pipe is used as the pre-tension element, it is advantageous if the guide pipe presses against the at least one guide face of the second deformation pipe section, the first and second pressure plates being received in the interior of the guide pipe and being movable in relation to the guide pipe in the longitudinal direction of the energy dissipation device during transmission of traction or impact forces occurring in normal travel operation. In this embodiment, the parts required for guiding the pressure plates of the damping unit are mounted on one hand inside the guide pipe and on the other hand also inside the second deformation pipe section. The guide pipe transmits the pre-tension required for the deformation pipe. Simultaneously, the pressure plates of the damping unit are decoupled from the energy dissipation unit. It is thus ensured that vehicular dynamic variables (i.e., the movements of the pressure plates of the damping unit) have no influence on the effectiveness and particularly the response behavior of the energy dissipation unit. In addition, an improved twist lock is provided, which makes it possible for the typical security to be ensured in spite of the small installation space which may be implemented by the solution according to the present invention.

As an implementation of the solution according to the present invention, it is also conceivable that the energy dissipation device has a deformation display, which is designed to display the utilization of the energy dissipation element after and/or upon response of the energy dissipation unit. Using this deformation display to be additionally provided, it is possible to decide easily whether or not the energy dissipation element of the energy dissipation unit has already been (partially or completely) triggered.

For this purpose, it is to be noted that the use of the deformation display is not restricted to the energy dissipation unit used in the energy dissipation device described above; rather, of course, it is also conceivable to use the deformation display per se even in other energy dissipation units known from the prior art, for example. The use of the deformation display in the energy dissipation unit used in the solution according to the present invention is solely to be seen as an exemplary embodiment.

In an embodiment of the deformation display which is particularly simple to implement but nonetheless effective, it is conceivable that the deformation display has a trigger which responds in the event of a plastic deformation of the energy dissipation element and initiates the deformation display. As an implementation of this trigger, it would be possible for the deformation display to comprise a signal element, such as a signal plate, which is fixed via a shear-off element as the trigger to the energy dissipation element, the shear-off element shearing off in the event of a plastic deformation of the energy dissipation element and losing its retention function, so that the signal plate is then no longer fixed on the energy dissipation element and it may thus be recognized easily that the energy dissipation element has already responded.

BRIEF DESCRIPTION OF THE DRAWINGS

In the following, a preferred embodiment of the energy dissipation device according to the present invention is described in greater detail on the basis of the attached drawings.

DETAILED DESCRIPTION OF THE INVENTION

A middle buffer coupling 100 known from the prior art is shown in a side view in FIG. 1. As already noted, the middle buffer coupling 100 has a coupling rod 101 having a coupling head 102, the coupling rod 101 being flanged via a bearing bracket 103 onto the front face of a car body (not explicitly shown) so it is pivotable in the horizontal plane. A damping unit 110 (traction and impact unit) is integrated in the coupling rod 101, which is used for the purpose of damping the traction and impact forces occurring in normal travel operation. In addition to this damping unit 110, a shock absorber is provided in the form of an energy dissipation unit 120, which, in the middle buffer coupling 100 shown in FIG. 1, has a deformation pipe 121 connected downstream from the bearing bracket 103 and the damping unit 110. In this typical solution, the damping unit 110 is thus connected in series to the energy dissipation unit 120. This has the result that both the damping unit 110 and also the energy dissipation unit 120 must be implemented as separate components, which has a negative effect on the overall length of the energy dissipation device provided with the middle buffer coupling 100.

Figure 2:
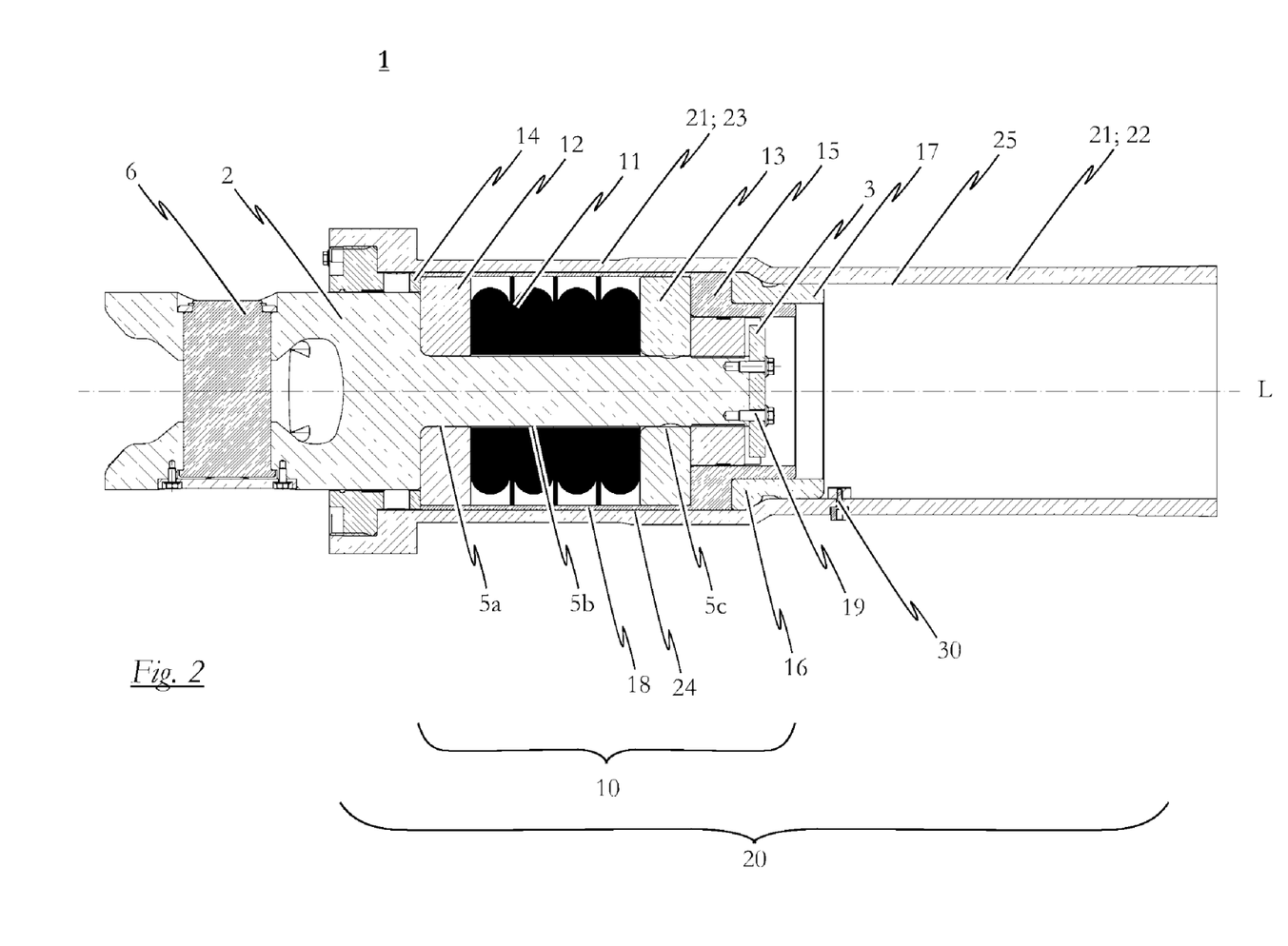
FIG. 2: shows a preferred embodiment of the energy dissipation device according to the present invention in a longitudinal section.

A possible embodiment of the energy dissipation device 1 according to the present invention is illustrated schematically in a longitudinal section in FIG. 2. The energy dissipation device 1 comprises a damping unit 10 having a regeneratively implemented damping element 11 in the form of spring elements, this damping element 11 being used for damping the traction and impact forces occurring in normal travel operation. These traction and impact forces are introduced via a force transmission element 2 into the damping unit 10 in the embodiment shown in FIG. 2.

The force transmission element 2 is implemented as a fork on its coupling-level-side end, which is used for receiving a correspondingly complementary implemented eye of a joint configuration (not explicitly shown). The fork and the eye received in the fork are mounted so they are pivotable in the horizontal plane via a pivot pin 6.

The energy dissipation device 1 has, in addition to the damping unit 10, an energy dissipation unit 20 having a destructively implemented energy dissipation element 21. The energy dissipation unit 20 is used for responding after a previously determinable critical impact force is exceeded and for converting at least a part of the impact forces transmitted via the energy dissipation device 1 into heat and deformation work and thus dissipating them by plastic deformation of the energy dissipation element 21.

As shown, the energy dissipation element 21 is implemented as a deformation pipe, which has a car-body-side first deformation pipe section 22 and a diametrically opposite second deformation pipe section 23. The second deformation pipe section 23 has a cross-section expanded in comparison to the first deformation pipe section 22. The damping unit 10 is completely received and integrated in the second deformation pipe section 23 of the energy dissipation element 21.

The damping unit 10 has a first pressure plate 12 and a second pressure plate 13, between which the damping element 11 is situated. Upon introduction of traction and impact forces occurring in normal travel operation into the energy dissipation device 1 and/or into the damping unit 10 via the force transmission element 2, the two pressure plates 12, 13 are displaced in relation to one another with simultaneous shortening of the distance between them in the longitudinal direction L of the energy dissipation device 1.

To optimize the longitudinal displacement of the pressure plates 12, 13 upon the introduction of traction or impact forces occurring in normal travel operation, the second deformation pipe section 23, in which the damping unit 10 is integrated, comprises at least one guide face 24, with which the two pressure plates 12, 13 interact in such a way that in the event of a longitudinal displacement, they are guided corresponding to the movement in the longitudinal direction L of the energy dissipation device 1. In the illustrated preferred embodiment of the energy dissipation device, a first stop 14 assigned to the first pressure plate 12 and a second stop 15 assigned to the second pressure plate 13 are provided as a mechanical stroke limiter of the damping unit 10. The longitudinal displaceability of the two pressure plates 12, 13 is delimited via these two stops 14, 15.

As already noted, the energy dissipation device 1 comprises a force transmission element 2, via which traction and impact forces are introduced into the damping unit 10. This force transmission element 2 has a car-body-side end section 2a, which runs through the first pressure plate 12, the damping element 11, and the second pressure plate 13 and has a counter element 3 on its car-body-side end. The counter element 3 works together with the second pressure plate 13 at least during a traction force transmission to transmit traction forces from the force transmission element 2 to the second pressure plate 13. The counter element 3 is connected in the illustrated embodiment via a screw connection 19 to the car-body-side end section 2a of the force transmission element 2.

It is especially preferable if the end section 2a of the force transmission element 2 has a guide face 4, which works together with corresponding guide faces in the passages 5a, 5b, 5c of the two pressure plates 12, 13 and the damping element 11 and thus, during a longitudinal displacement of the pressure plates 12, 13 in the longitudinal direction L of the energy dissipation device 1, ensures guiding thereof.

In order that the impact forces may be introduced into the first deformation pipe section 22 in the most uniform possible way, a conical ring 16 is additionally provided at the transition between the first and second deformation pipe sections 22, 23, which works together with the second stop 15 in such a way that the forces transmitted during an impact force transmission from the second pressure plate 13 to the second stop 15 are transmitted via the conical ring 16 to the first deformation pipe section 22. The conical ring 16 has a guide section 17, which at least partially projects into the first deformation pipe section 22 and presses against the internal face 25 of the first deformation pipe section 22.

Furthermore, a pre-tension element 18 in the form of a guide pipe is provided, which pre-tensions the second stop 15 against the conical ring 16. Specifically, the pre-tension element 18 implemented as a guide pipe is connected on its car-body-side end to the second stop 15 and abuts the first stop 14 at its opposite end, by which a constant distance is fixed between the two stops 14, 15 before response of the energy dissipation unit 20. The pre-tension element 18 implemented as a guide pipe presses against the at least one guide face 24 of the second deformation pipe section 23, the first and second pressure plates 13, 14 being received in the interior of the guide pipe 18 and being movable in relation to the guide pipe 15 in the longitudinal direction L of the energy dissipation device 1 if traction or pressure forces occurring in normal travel operation are exceeded.

Figure 3:
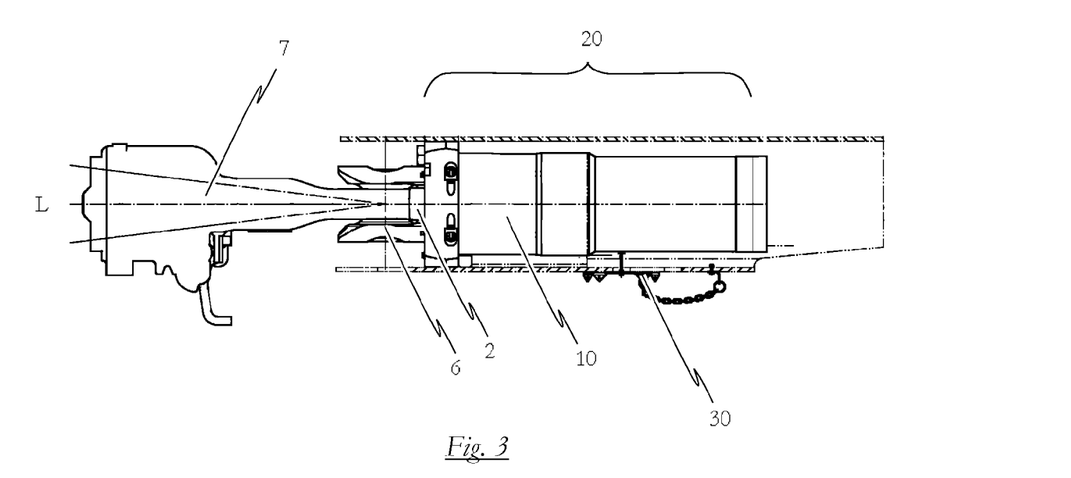
FIG. 3: shows a side view of the energy dissipation device from FIG. 2 in an exemplary application.
Figure 4:
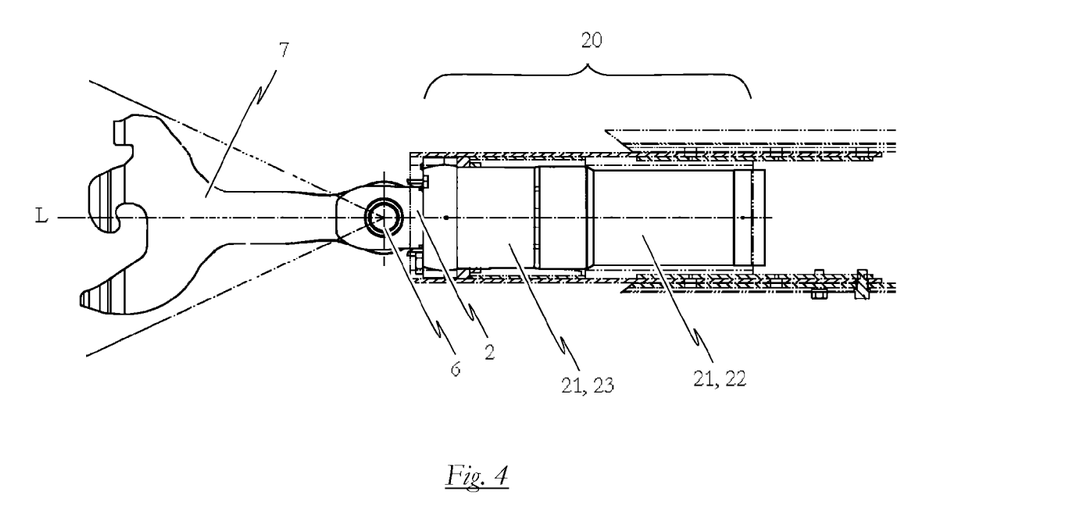
FIG. 4: shows a top view of the application shown in FIG. 3.

A possible application of the energy dissipation device 1 described above with reference to FIG. 2 is shown in each of FIGS. 3 and 4 in a side view and in a top view, respectively. It may be seen that the coupling-level-side end section of the force transmission element 2 is connected to a coupling arm 7 in such a way that the coupling arm 7 may be pivoted in the horizontal and vertical planes. For this purpose, a rotation pin 6 is used which connects the fork provided on the coupling-level-side end of the force transmission element 2 to the corresponding complementary eye of the coupling rod 7. The energy dissipation device 1, in which both the damping unit 10 and also the energy dissipation unit 20 are integrated, is thus situated behind the pivot pin 6 of the coupling configuration.

Figure 5:
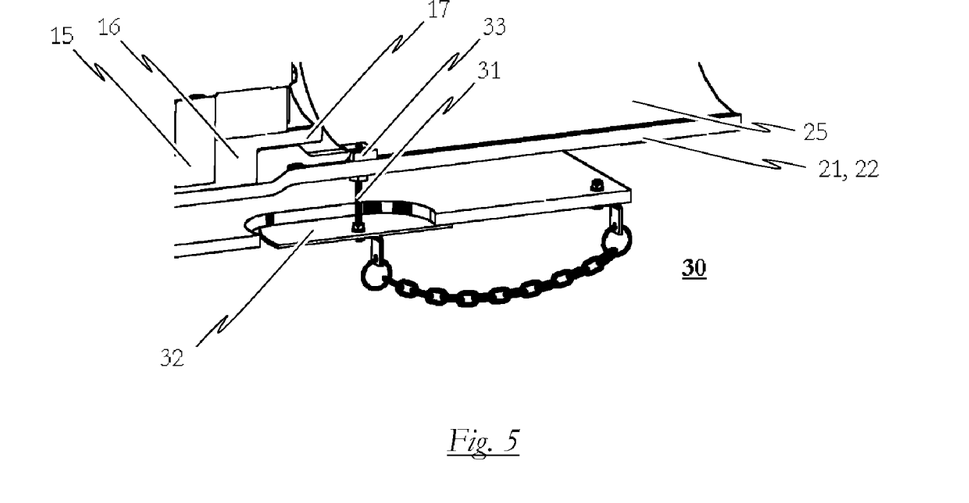
FIG. 5: shows a perspective partial view of the deformation display used in the energy dissipation device according to the preferred embodiment before the utilization of the energy dissipation element.
Figure 6:
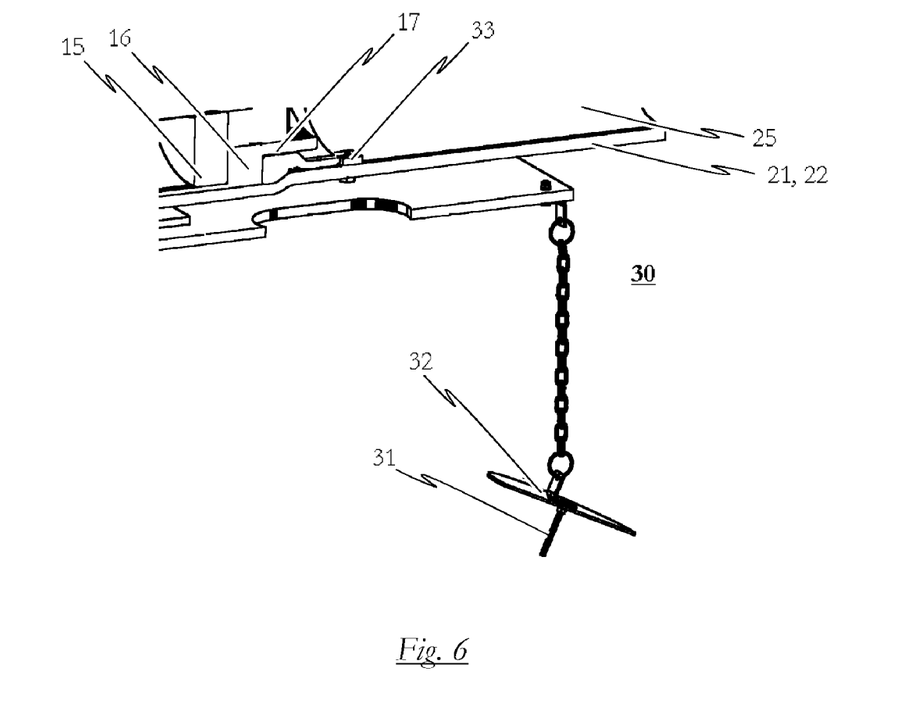
FIG. 6: shows the deformation display shown in FIG. 5 after utilization of the energy dissipation element.

Furthermore, a deformation display 30 is indicated in the application shown in FIG. 3, which is described in greater detail in the following with reference to FIGS. 5 and 6.

The deformation display 30 is shown before its response in FIG. 5 in a perspective partial section. The deformation display 30 has a signal plate 32, which is connected via a shear-off pin 31 to a block 33 in the interior of the deformation pipe 21. If the response force of the deformation pipe 21 is reached, the conical ring 16 shears through the shear-off pin 31 and the signal plate 32 hangs well visible on the chassis of the vehicle (cf. FIG. 6). It may thus be recognized easily and reliably whether the deformation pipe 21 has responded. Depending on the position in which the shear-off pin 31 is situated in the interior of the deformation pipe 21, how far the deformation pipe 21 has responded may also be signaled via the deformation display 30.

The embodiment of the present invention is not restricted to the exemplary embodiment described with reference to the figures. Rather, the individual features described therein may be implemented in any arbitrary combination with one another. In particular, for example, it is also conceivable that the deformation display is used in another energy dissipation unit which is not a component of the energy dissipation device according to the present invention.

In particular, the present invention also relates to a rail vehicle having multiple car bodies, traction and impact forces being transmitted between the car bodies in travel operation, and the rail vehicle having an energy dissipation device, which has the following: a damping unit having a regeneratively implemented damping element for damping traction and impact forces occurring in normal travel operation; and an energy dissipation unit having a destructively implemented energy dissipation element, which is designed to respond after a previously determinable critical impact force is exceeded and to convert at least a part of the impact forces transmitted via the energy dissipation device into heat and deformation work via plastic deformation and thus dissipate them, the damping unit being integrated in the energy dissipation unit in such a way that upon a transmission of impact forces, the force flux runs through both the damping unit and also the energy dissipation element.

In this rail vehicle, it is preferable if the energy dissipation element is implemented as a deformation pipe and the damping element of the damping unit is implemented as a spring element or as an elastomeric body. Furthermore, it is preferable if the damping element or the damping unit is connected in parallel to the energy dissipation element of the energy dissipation unit, so that upon a transmission of impact forces, the incident force flux fundamentally runs through both the damping element and also the energy dissipation element.

It would also be conceivable for the energy dissipation element to be implemented as a deformation pipe having a first deformation pipe section on the car body side and an opposing second deformation pipe section, the second deformation pipe section having a cross-section expanded in comparison to the first deformation pipe section, and the damping unit being integrated in the second deformation pipe section.

| LIST OF REFERENCE NUMERALS | |
|---|---|
| 1 | energy dissipation device |
| 2 | force transmission element |
| 2a | car-body-side end section of the force transmission element |
| 3 | counter element |
| 4 | guide face |
| 5a-c | passage |
| 6 | pin |
| 7 | coupling arm |
| 10 | damping unit |
| 11 | damping element |
| 12 | first pressure plate |
| 13 | second pressure plate |
| 14 | first stop |
| 15 | second stop |
| 16 | conical ring |
| 17 | guide section |
| 18 | pre-tension element |
| 19 | screw connection |
| 20 | energy dissipation unit |
| 21 | energy dissipation element |
| 22 | first deformation pipe section |
| 23 | second deformation pipe section |
| 24 | guide face |
| 25 | guide face |
| 30 | deformation display |
| 31 | shear-off pin |
| 32 | signal plate |
| 33 | block |
| L | longitudinal direction of the energy dissipation device |
| 100 | middle buffer coupling (prior art) |
| 101 | coupling rod (prior art) |
| 102 | coupling head (prior art) |
| 103 | bearing bracket (prior art) |
| 110 | damping unit (prior art) |
| 120 | energy dissipation unit (prior art) |
| 121 | deformation pipe (prior art) |

The invention claimed is:

1. An energy dissipation device for a car body of a multi-element vehicle, in particular a rail vehicle, impact and traction forces being transmitted between the car bodies of the vehicle in travel operation, and the energy dissipation device having the following:
 a damping unit having a regeneratively implemented damping element for damping traction and impact forces occurring in normal travel operation; and
 an energy dissipation unit having a destructively implemented energy dissipation element, which is designed to respond after a previously determinable critical impact force is exceeded and to convert at least a part of the impact forces transmitted via the energy dissipation device into heat and deformation work by plastic deformation and thus dissipate them,
 wherein the energy dissipation element is implemented as a deformation pipe having a car-body-side first deformation pipe section and a diametrically opposite second deformation pipe section, the second deformation pipe section having a cross-section expanded in comparison to the first deformation pipe section,
 wherein the damping unit is integrated in the second deformation pipe section in such a way that upon a transmission of impact forces, a force flux runs through both the damping unit and also the energy dissipation element,
 wherein the damping unit has first and second pressure plates, between which the damping element is situated, and upon introduction of traction or impact forces occurring in normal travel operation into the energy dissipation device, the two pressure plates are displaceable in relation to one another with simultaneous shortening of the distance between them in the longitudinal direction of the energy dissipation device, wherein the damping unit having the first and second pressure plates is integrated in the second deformation pipe section in such a way that upon a transmission of impact forces, the force flux runs through both the damping unit and also the energy dissipation element, wherein the damping unit also has a conical ring, which is situated at a transition between the first and second deformation pipe sections, wherein the conical ring has a guide section, which at least partially projects into the first deformation pipe section and presses against the internal face of the first deformation pipe section, wherein the second deformation pipe section has at least one guide face, with which the first and second pressure plates interact in such a way that during a longitudinal displacement thereof, a movement of the first and/or second pressure plate is guided in the longitudinal direction of the energy dissipation device, wherein the energy dissipation device also has a force transmission element for introducing traction and impact forces into the damping unit, said force transmission element comprising a coupling-level-side end section having a rotation pin and an end section on the car body side, which runs through the first pressure plate, the damping element, and the second pressure plate, and has a counter element on its car-body-side end, which works together with the second pressure plate at least during a traction force transmission and transmits traction forces from the force transmission element to the second pressure plate, and wherein the end section of the force transmission element has a guide face which works together with corresponding guide faces in passages of the two pressure plates and the damping element and thus ensures guiding of the pressure plates upon their longitudinal displacement in the longitudinal direction of the energy dissipation device, and which directs forces introduced by the force transmission element into the energy dissipation device in a longitudinal direction such as to ensure a correct functional operation of the first deformation pipe with the rotation pin of the force transmission element, wherein the damping unit also has a pre-tension element, which pre-tensions the second stop against the conical ring, wherein the pre-tension element is implemented as a guide pipe, which is connected to the second stop on its car-body-side end and abuts the first stop at its opposite end and fixes a constant distance between the two stops before response of the energy dissipation unit, wherein the guide pipe presses against the at least one guide face of the second deformation pipe section, and the first and second pressure plates are received in the interior of the guide pipe and are movable in relation to the guide pipe in the longitudinal direction of the energy dissipation device during a transmission of traction or impact forces occurring in normal travel operation.

2. The energy dissipation device according to claim 1, wherein the damping unit has a first stop assigned to the first pressure plate and a second stop assigned to the second pressure plate, said first and second stop delimiting the longitudinal displaceability of the two pressure plates.

3. The energy dissipation device according to claim 2, wherein the conical ring of the damping unit works together with the second stop in such a way that the forces transmitted from the second pressure plate to the second stop during an impact force transmission are transmitted via the conical ring to the first deformation pipe section.

4. The energy dissipation device according to claim 3, wherein the conical ring is engaged in a formfitting and/or friction-locked way with the second stop.

5. The energy dissipation device according to claim 1, which also has a deformation display, which is designed to display a utilization of the energy dissipation element after and/or during response of the energy dissipation unit.

6. The energy dissipation device according to claim 5, wherein the deformation display has a shear-off element, which shears off upon a plastic deformation of the energy dissipation element and initiates the deformation display.

7. The energy dissipation device according to claim 6, wherein the deformation display has a signal element, which is fixed on the energy dissipation element via a shear-off element, the shear-off element shearing off in an event of a plastic deformation of the energy dissipation element and losing its retention function.

\* \* \* \* \*